United States Patent [19]

Criscuolo

[11] Patent Number: 5,031,713
[45] Date of Patent: Jul. 16, 1991

[54] SUPPORT BRACKET FOR GOLF CART ROOF ASSEMBLY

[75] Inventor: James M. Criscuolo, Newnan, Ga.

[73] Assignee: Yamaha Motor Manufacturing Corporation of America, Newnan, Ga.

[21] Appl. No.: 468,839

[22] Filed: Jan. 23, 1990

[51] Int. Cl.$^5$ ............................................. B62D 33/077
[52] U.S. Cl. ........................ 180/89.1; 280/DIG. 5; 296/210; 296/187; 296/102
[58] Field of Search ..................... 180/89.1; 280/32.5, 280/DIG. 5, 756; 296/210, 102, 216, 196, 187

[56] References Cited

U.S. PATENT DOCUMENTS

| | | | |
|---|---|---|---|
| 2,844,209 | 7/1958 | Brunderman | 180/89.1 |
| 3,323,608 | 6/1967 | Eggert, Jr. | 296/187 |
| 3,451,715 | 6/1969 | Stuckenberger | 296/102 |
| 4,037,614 | 7/1977 | Hines et al. | 296/102 |
| 4,453,763 | 6/1984 | Richards | 280/756 |
| 4,669,565 | 6/1987 | Miki et al. | 280/756 |
| 4,778,214 | 10/1988 | Fu | 296/102 |
| 4,781,260 | 11/1988 | Morita et al. | 280/756 |

FOREIGN PATENT DOCUMENTS 1430761  11/1968  Fed. Rep. of Germany ...... 280/756

*Primary Examiner*—Charles A. Marmor
*Assistant Examiner*—Tamara L. Finlay
*Attorney, Agent, or Firm*—Haugen and Nikolai

[57] ABSTRACT

A mounting bracket arrangement for use in a golf cart so that an optional roof assembly may be readily added to the vehicle, either at the factory or later on in the field without the need for any special tools or equipment other than conventional hand tools. The support bracket in question underlies the cowl and is affixed at its lower ends to a rigid frame element. The opposite end is adapted to be joined to the roof support rails using bolts or other suitable fasteners extending through cylindrical tubular spacers located in the holes drilled through the thickness dimension of the vehicle's cowl.

2 Claims, 3 Drawing Sheets

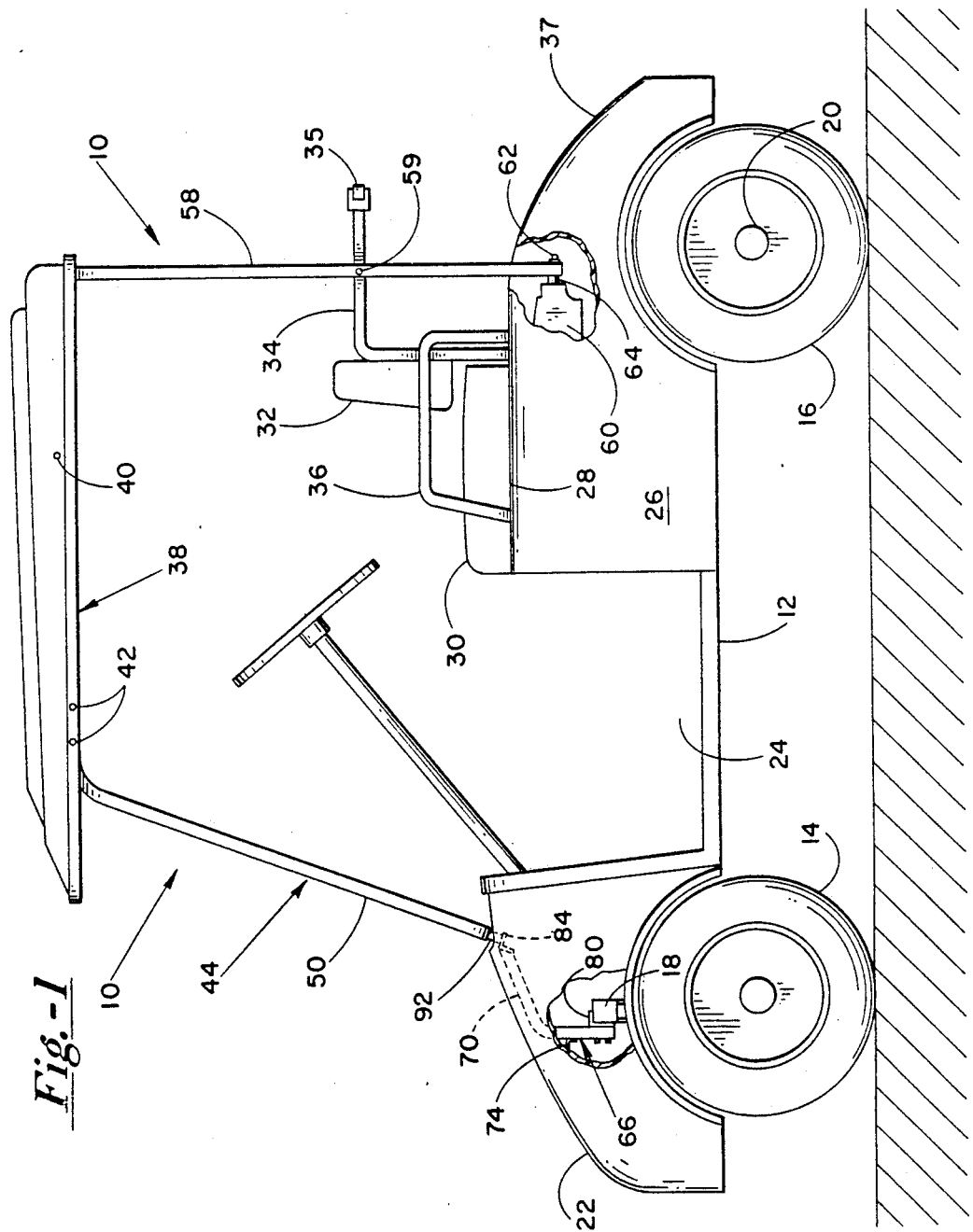

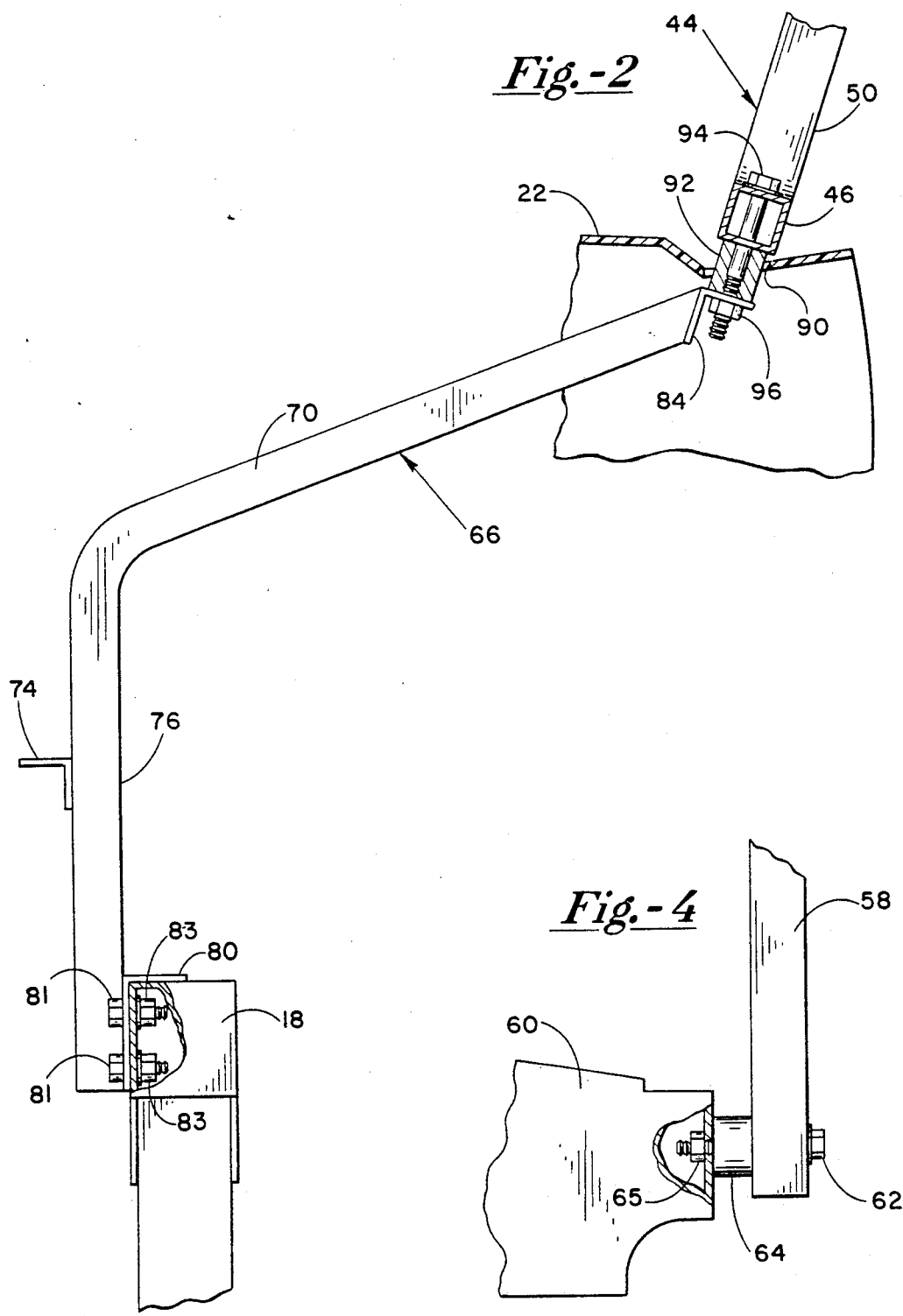

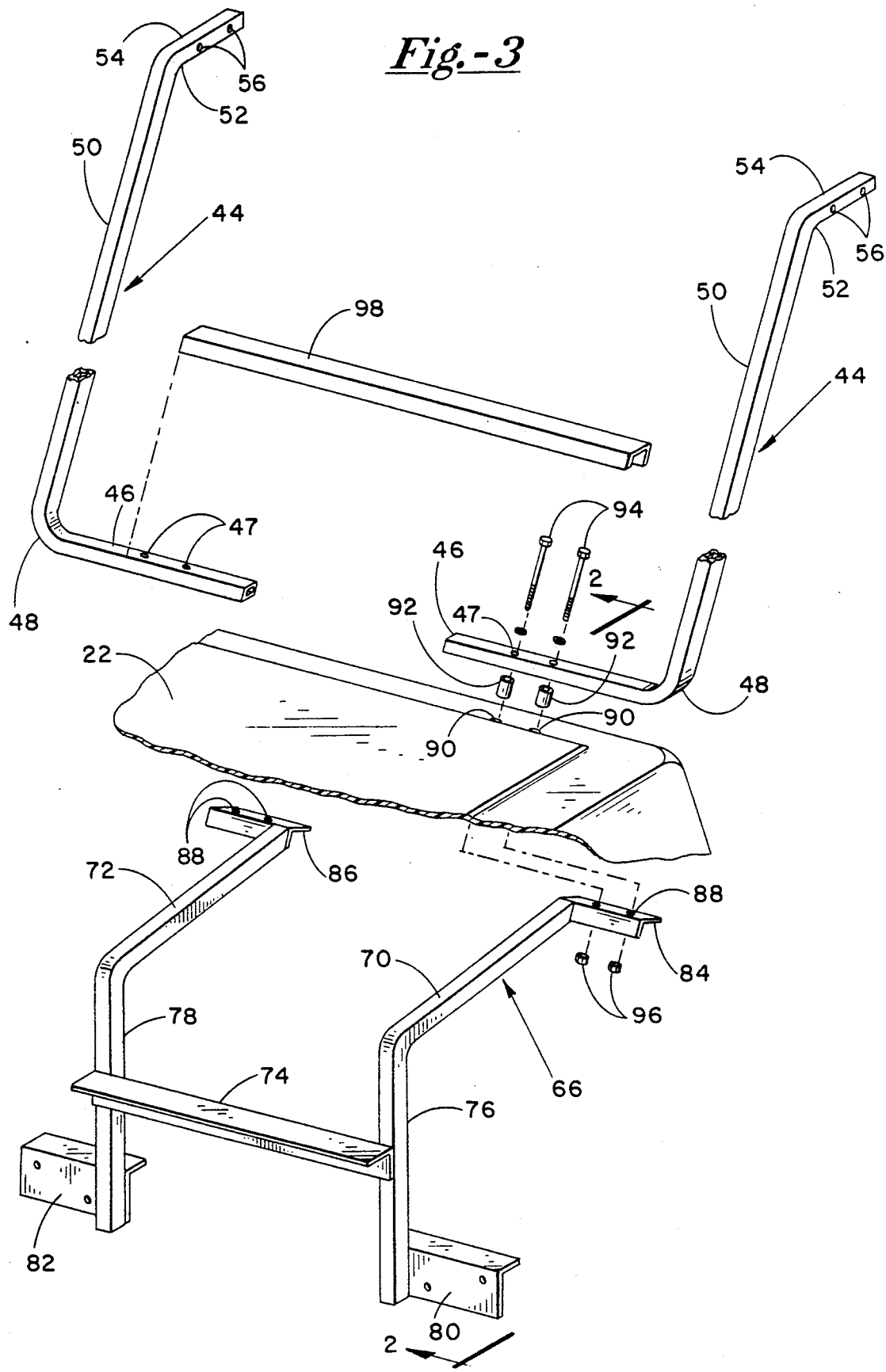

5,031,713

SUPPORT BRACKET FOR GOLF CART ROOF ASSEMBLY

BACKGROUND OF THE INVENTION

I. Field of the Invention

This invention relates generally to a motor-powered golf cart, and more particularly to an apparatus for mounting an optional roof assembly thereon.

II. Discussion of the Prior Art

Motorized golf carts are now commonly used on golf courses through the United States. Such carts generally comprise a frame from which is suspended a set of front and rear wheels, the front wheels being steerable and the rear wheels being driven by a DC motor from a battery power supply or by an internal combustion engine. Supported on the frame is a molded plastic body including a front cowl, open sides for ease of ingress and egress and a seat for accommodating a driver and usually one passenger. Behind the seat is an open trunk space for accommodating one or more golf bags.

Some golfers prefer being exposed to the sun and, therefore, prefer not to have a cart with a roof assembly mounted on it. Others, however, desire to be shaded from the sun and protected from rain or drizzle and thus prefer their golf cart to include a roof.

In the past, it has been the practice to attach the optional roof assembly to the cart by attaching the front roof support braces to the molded plastic cowl by drilling holes through the cowl and then passing threaded bolts through the front support braces, through the holes in the cowl and through a suitable backup member which then clamps the bracket to the cowl when nuts are assembled to the threaded bolts. This method of attachment has not been altogether free of problems, especially when certain types of plastic are used in molding the cowl portion of the body. Certain plastic materials are quite flexible and resilient and when clamping to those types of materials, the roof assembly tends to sway as the vehicle traverses uneven terrain.

OBJECTS

It is accordingly a principal object of the present invention to provide an improved method of mounting a roof assembly to a golf cart.

Another object of the invention is to provide a mounting assembly for the roof of a golf cart type vehicle which affixes it to the vehicle's frame rather than to its molded plastic body cowl.

Yet another object of the invention is to provide an improved mounting bracket which remains hidden from view beneath the vehicle's cowl and is available for use in mounting a roof assembly to the vehicle on an optional basis when so desired.

SUMMARY OF THE INVENTION

The foregoing objects and features of the invention are achieved by attaching a first bracket rigidly to the vehicle frame beneath the front cowl and totally out of sight. When it is desired to utilize the optional roof, a set of small holes are drilled through the cowl at predetermined locations so as to line up with corresponding holes and captured nuts in the hidden bracket. A roof support brace or braces (depending on desired design) to which the roof itself is ultimately attached is then joined to the first or hidden bracket by providing tubular spacers between the bracket and the roof support brace, then passing bolts through each as well as the spacer and then fastening the assembly tight using the captured nuts. The holes drilled through the cowl are slightly larger than the outside diameter of the tubular spacers and, as such, the roof support braces are rigidly attached to the first bracket rather than to the flexible, deformable surface of the cowl.

DESCRIPTION OF THE DRAWINGS

The invention will be described in greater detail below by reference to the accompanying drawings in which like numerals in the several views refer to corresponding parts.

FIG. 1 is a side elevational view of the golf cart incorporating an optional roof assembly joined to the vehicle in accordance with the invention;

FIG. 2 is a side elevation of the mounting bracket assembly employed in the embodiment of FIG. 1; and FIG. 3 is an exploded view of the roof mounting assembly and illustrating its mode of attachment to the vehicle; and FIG. 4 illustrates the manner in which the rear roof brackets are secured to the vehicle.

DESCRIPTION OF THE PREFERRED EMBODIMENT

Referring to FIG. 1, there is indicated generally by numeral 10 a golf cart comprising a frame 12 supported by a pair of front steerable wheels 14 and rear driven wheels 16. The front wheels are resiliently supported by springs and shock absorbers (not shown) from a horizontal beam 18 which is welded, bolted or otherwise secured to the frame 12. In a similar fashion, the rear driven wheels are also provided with a suspension system (not shown) operatively disposed between the axle 20 and the frame 12.

Covering the front portion of the frame and the front suspension system is a decorative cowl 22 which is preferably molded from a suitable material such as METTON ® Plastic which is a polymer manufactured and sold by the Hercules Corporation. While METTON ® plastic is preferred, other materials such as molded fiberglass with a gel coat exterior surface or polypropylene may also be employed.

The golf cart vehicle preferably is open at both sides, as at 24, to allow ease of entry and exit by the driver and/or a passenger. The body portion of the vehicle further includes a molded plastic side panel 26 having an upper surface 28 supporting a seat cushion 30. In addition to the seat cushion, a seat back member 32 is provided and it is preferably supported by a formed steel or aluminum tube 34 the legs of which project upward from an attachment point comprising a portion of the frame. Bent tubular side rails 36 are provided on each side of the seat assembly for the convenience, comfort and safety of the operator and any passenger. The trunk portion 37 of the body is not covered as it would be on a conventional automobile, but instead comprises a horizontal deck located behind the seat back 32 on which golf bags may be carried in their upright position. Bags are held in this upright position by a bag support 35 which is fastened to the bent extension of the seat back support 34.

The golf cart vehicle described thus far may be considered somewhat conventional and the present invention centers upon the roof assembly indicated generally by numeral 38 and especially its mode of attachment to the vehicle.

With continued reference to FIG. 1, the top or roof assembly 38 includes a molded plastic roof member 40 which is secured by bolts as at 42 to a pair of front roof support posts or brace means 44 which are maintained in parallel, spaced-apart relation on the opposed side edges of the vehicle body. Alternatively, the roof support posts may comprises a one-piece formed assembly. The brace means 44 preferably comprise extruded metal tubes having a generally rectangular cross-section. The particular shape of the front roof support brace means 44 can best be seen in the exploded view of FIG. 3 and include a generally horizontal lower end portion 46 which meets at a right angle bend 48 with the upwardly extending posts 50. The upper ends of the posts are again bent at an appropriate angle, as at 52, so as to provide a generally horizontal upper end portion 54. The upper end portion includes through-holes 56 for receiving a set of bolts 42 therethrough. The manner in which the lower end portions 46 are fastened to the vehicle will be explained in considerable detail hereinbelow.

The rear portion of the roof 40 is likewise supported by a pair of posts or braces 58 which passes through an appropriate opening formed in the molded plastic body and attaches to the attachment bracket 60 on the vehicle's frame 12 by means of a bolt 62 extending through holes drilled in the brace 58 and through a tubular spacer 64 into a hole in the bracket 60 and into a captured nut 65. The uprights 58 are further supported by a bolt 59 passing through holes in the uprights 58 and the swept-back portion of the seat support 34 and into a nut.

As has been indicated in the introductory portion of this patent application, the typical prior art method of securing the lower end of the front brace means 44 was to attach them directly to the molded plastic cowl 22 near the vehicle's dashboard. This mode of attachment proved to be fraught with problems, mainly due to the flexible nature of the plastic material from which the cowl 22 is fabricated. In accordance with the present invention, each golf cart vehicle, whether or not it is ultimately to have a roof, includes a lower bracket means 66 which is bolted at one end to the suspension bar 18 which is part of the frame 12. The mounting bracket 66 is included in all of the golf carts so as to be available if an owner chooses to mount the optional roof assembly to the vehicle.

The shape and make-up of the bracket assembly 66 is more readily seen in the enlarged side view thereof shown in FIG. 2 and in the exploded perspective view of FIG. 3. It includes first and second L-shaped rods 70 and 72, the two being held together by a spacing means 74 in the form of a piece of angle iron which is welded or otherwise attached to the bracket rod elements 70 and 72 to maintain them in a parallel, spaced-apart relationship. The rods may be fabricated from tubular steel of rectangular cross-section. Mounted proximate the lowermost ends 76 and 78 of each of the members 70 and 72 are a pair of lower flange plates 80 and 82 which, as shown in FIG. 2, are formed from angle iron and are bolted to the front wheel suspension cross-bar 18 by bolts 81 and captured nuts 83.

Similarly, attached to the opposite ends of the tubular rods 70 and 72 are upper flange means 84 and 86 which are preferably welded to the rods 70 and 72.

The spacing between the mounting bracket rods 70 and 72 is such that the holes 88 drilled through the flange means 84 and 86 will be generally aligned with the holes 47 drilled through the lower end portion 46 of the front tubular braces 44.

When the golf cart vehicle is to include the optional roof assembly, holes as at 90, are drilled through the plastic cowl and are of a diameter sufficiently large that short cylindrical tubular spacer means as at 92 may pass therethrough with sufficient clearance to avoid any contact between the cowl and the exterior of the spacer means. The holes 90 are strategically placed so that they will be generally aligned with the holes 88 drilled in the flange means 84 and 86, allowing fasteners as at 94 to pass through the holes 47, the spacer means 92, the holes 90 drilled through the plastic cowl and the holes 88 drilled in the flange means 84 and into the captured nuts 96. When the bolt 94 is tightened down, the roof support braces 44 are firmly secured to the bracket assembly 66 which is rigidly connected to the frame.

A short piece of molded or extruded plastic or aluminum, indicated by numeral 98, may be press-fit or fastened onto the lower portions 46, to cover the ends of the bolts 94 used to join the roof braces to the underlying roof support bracket 66, and to render the assembly more aesthetically pleasing.

Typically, a golf course will buy or lease a fleet of carts and some will be equipped with a roof assembly and other will not. Of course, if no sunroof is to be utilized with the golf cart, the bracket assembly 66 will still be installed, but no holes will be drilled through the cowl until such time as a roof assembly is to be used with the cart.

It can be seen, then, that the present invention provides a means whereby the roof assembly can be effectively joined to the rigid frame of the cart rather than to the molded plastic cowl. This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In combination with a golf cart of the type including a frame, at least one steerable wheel, suspension means for suspending said steerable wheel from said frame, a pair of rear wheels suspended from said frame and driven by motor means, a body supported by said frame, said body including a front cowl surrounding said suspension means, seat means and a rear trunk, and a roof member, an improved mounting fixture for supporting said roof member, comprising:
 (a) bracket means disposed beneath said front cowl and including
  (i) first and second generally L-shaped rigid rails with upper and lower ends,
  (ii) spacing means attached to said first and second rails for maintaining said rails in spaced, parallel alignment,
  (iii) first flange means for attaching said lower end of said first and second rails to said suspension means,
 (b) elongated, roof member supporting brace means disposed above said cowl and including upwardly extending posts;

(c) tubular spacer means passing through said cowl without contacting same and positioned between said upper ends of said first and second L-shaped rigid rails and said roof member supporting brace means;

(d) fastener means extending through said upper ends of said first and second generally L-shaped rigid rails, said tubular spacer means and said roof member supporting brace means for rigidly joining said roof member supporting brace means to said rigid rails; and (e) means connecting said roof member to said posts of said brace means.

2. The mounting fixture as in claim 1 wherein said fastener means includes a plurality of bolts, said tubular spacer means being disposed between said roof member supporting brace means and second flange means affixed to said upper end of said rails and passing through holes formed through said cowl, said plurality of bolts passing through said roof member supporting brace means, said tubular spacer means and said second flange means affixed to said upper end of said rails.

* * * * *